Figures 1, 2, 3:
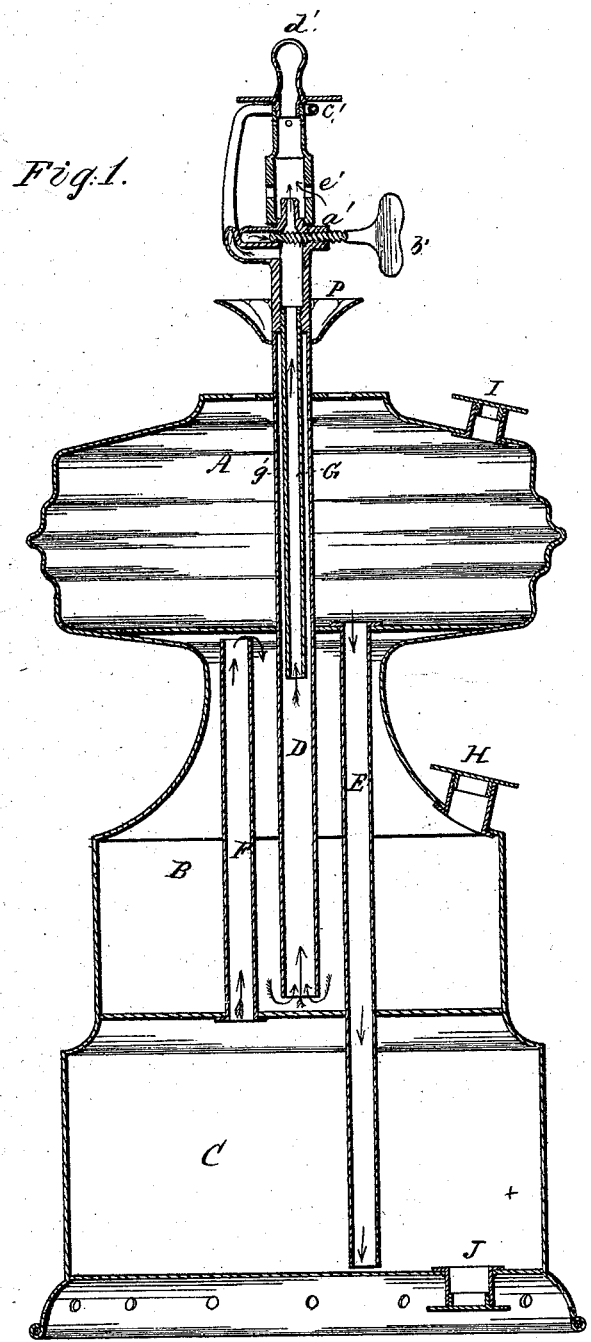

J. S. WOOD.
Lamps.

No. 149,557. Patented April 7, 1874.

Witnesses
Thomas E. Hathaway
J. O. Robinson

Inventor
Joseph S. Wood

UNITED STATES PATENT OFFICE.

JOSEPH S. WOOD, OF BROOKLYN, NEW YORK.

IMPROVEMENT IN LAMPS.

Specification forming part of Letters Patent No. 149,557, dated April 7, 1874; application filed October 9, 1873.

*To all whom it may concern:*

Be it known that I, JOSEPH S. WOOD, of Brooklyn, Kings county, State of New York, have invented certain Improvements in Pneumatic Safety-Lamps, of which the following is a specification:

The nature of my invention consists in constructing lamps in three distinct air-tight chambers, one above the other. The bowl or upper chamber contains the water, the second or middle to contain the oil, and the bottom or lower chamber contains the air; also, the manner of connecting the upper water-reservoir with the lower or air chamber, with a pipe for the passage of water into the lower chamber to create a pressure of air; also, connecting the oil-chamber with pipes through the water-reservoir, and in connection with the burner.

To enable others skilled in the art to make and use my invention, I will proceed to describe its construction and operation, reference being had to the accompanying drawings.

Figure 1 is a vertical section of the lamp for burning light oils, and using generating-vapor burners of any description.

A is the bowl or top chamber of the lamp for holding the water, and is connected with the lower chamber C by the circulating-pipe E. B is the middle or oil-chamber, connected with the air-chamber C by the pipe F. C is the air-pressure chamber. D is the oil-pipe. E is the water-pipe. F is the air-pipe. G is the inside oil-tube in D for keeping the oil from being chilled in cold weather, also forming an air-cushion for steadying the flame. H is the filling-screw for oil. I is the filling-screw for water. J is the discharge-screw for waste water.

The operation of the lamp is as follows: Chamber B is filled with oil at H, and the cap is screwed down air-tight. The upper chamber or reservoir A is filled with water at I. The water passes down pipe E into the air-chamber C. When sufficient passes down it seats the mouth of pipe E, and creates a pressure of air in chamber C, which passes up pipe F into chamber B, and forces the oil up pipe D and G, which acts as an air-cushion for steadying the flame. The pipe D keeping the oil-pipe G from contact with the cold water in reservoir A, when the burner, valve, or cock is opened, and the oil is allowed to flow to the point of combustion through pipes D and G, as fast as the oil is consumed the air occupies its place in chamber B, the oil being forced to the point of combustion by atmospheric pressure sustained by a column of water.

What I claim as my invention, and desire to secure by Letters Patent, is—

The combination of the chambers A, B, and C, and the pipes D, E, F, and G, for the purpose shown and described.

JOSEPH S. WOOD.

Witnesses:
J. E. ROBINSON,
WM. D. BLACK.